April 21, 1953
T. G. JONES
2,636,056
PROCESS OF RECOVERY OF CYCLOPENTADIENE AND METHYL
CYCLOPENTADIENE FROM CRACKED PETROLEUM
Filed Oct. 18, 1950
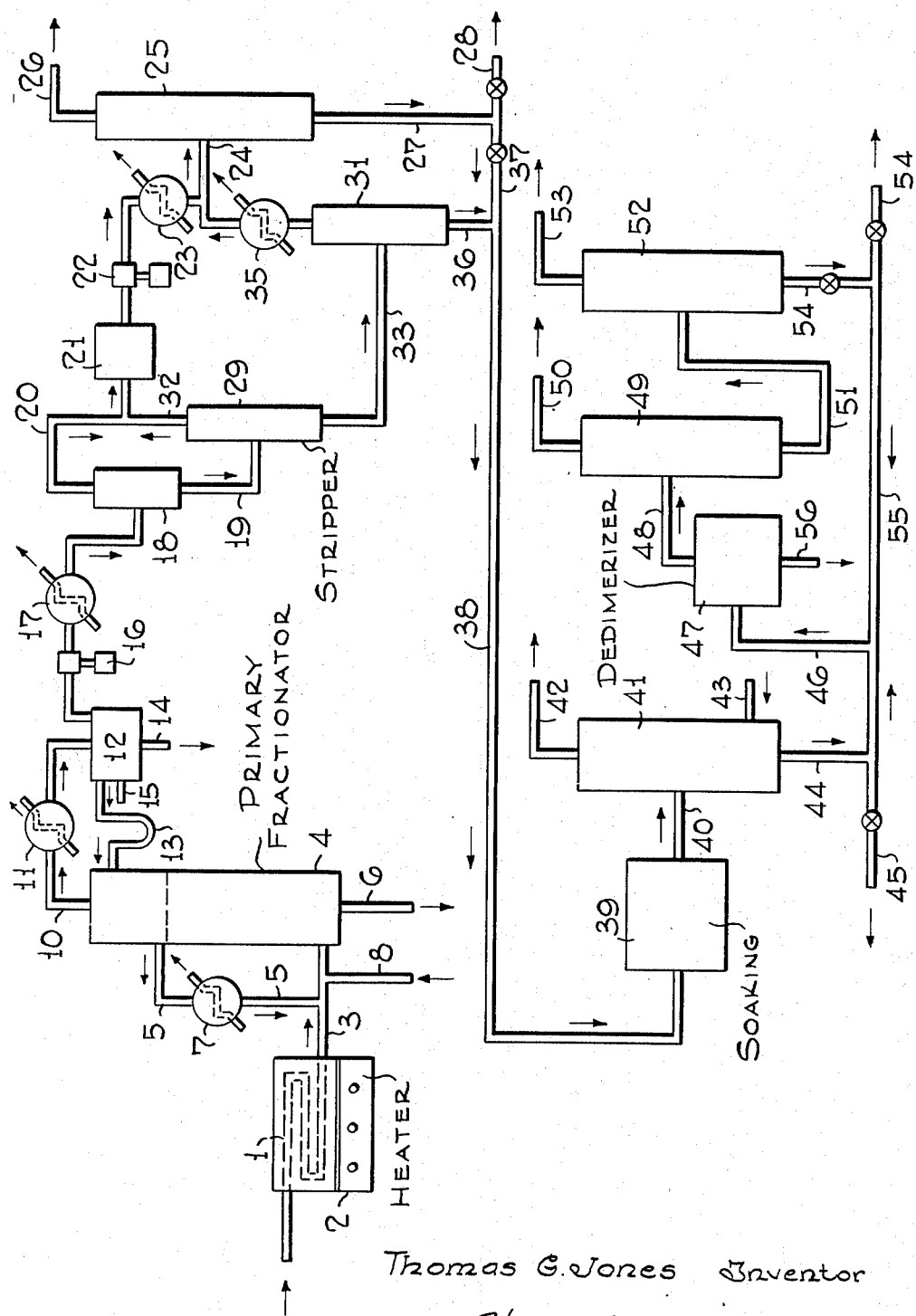
Thomas G. Jones  Inventor
By Henry Berk  Attorney Patented Apr. 21, 1953

2,636,056

UNITED STATES PATENT OFFICE 2,636,056

PROCESS OF RECOVERY OF CYCLOPENTADIENE AND METHYL CYCLOPENTADIENE FROM CRACKED PETROLEUM

Thomas G. Jones, Baton Rouge, La., assignor to Standard Oil Development Company, a corporation of Delaware Application October 18, 1950, Serial No. 190,748

3 Claims. (Cl. 260—666)

This invention relates to process steps that are useful in treating high-temperature vapor-phase cracked hydrocarbon petroleum products for the separation and recovery of cyclopentadiene and methyl cyclopentadiene therefrom.

The separation and recovery of cyclopentadiene from cracked petroleum products has presented a number of problems, because the cyclopentadiene in the freshly cracked products tends to be present both as monomer and polymer mixed with various hydrocarbons which tend to polymerize, copolymerize with the cyclopentadiene, and have boiling points close to the monomeric and dimeric cyclopentadiene. The cyclopentadiene monomer tends to undergo dimerization, or polymerization; and its dimer tends to undergo depolymerization very readily at moderately elevated temperatures. Some methods were previously devised for collecting and segregating cyclopentadiene existing as dimers in an aromatic naphtha fraction of the cracked products, but such methods were found to incur losses of cyclopentadiene as monomer during the segregation of the dimer and to require extra costly steps and equipment for recovering the cyclopentadiene monomer from the thus concentrated dimer. Furthermore, now it has been found that a surprisingly large amount of methyl cyclopentadiene tends to occur in the cracked products, both as monomer and dimer, and this further complicated the procedures of segregating cyclopentadiene and its homologues.

The process of the present invention, in contrast to methods of concentrating the cyclopentadiene dimer in an aromatic naphtha fraction, first principally maintains practically all the cyclopentadiene and the methyl cyclopentadiene as monomers in a vapor portion of the cracking zone effluent stream from which the naphtha aromatics are separated. A substantial part of the cyclopentadiene monomer can be maintained in the vapor phase diluted largely by $C_1$–$C_5$ hydrocarbons and steam while eliminating therefrom methyl cyclopentadiene and higher boiling hydrocarbons as liquid condensates in order to recover a relatively high purity cyclopentadiene dimer finally from the monomer-containing vapor stream. However, the present invention makes possible a further larger recovery of cyclopentadiene and methyl cyclopentadiene from the aforementioned liquid condensates which were purposely eliminated from the vapor stream containing the cyclopentadiene monomer.

The process steps with which the present invention is mainly concerned reside in the following outlined stages of treatment:

(1) A separation of the cracked hydrocarbon vapor stream containing cyclopentadiene and methyl cyclopentadiene as monomers, advantageously under such conditions that these monomers are rapidly removed in a diluted stream of the vapors from the higher boiling cracked products to a second stage in which the cyclopentadiene monomer is satisfactorily freed of methyl cyclopentadiene and higher boiling hydrocarbons while it is maintained in vapor phase diluted by principally $C_1$ to $C_5$ hydrocarbons;

(2) In said second stage, the vapor stream containing the cyclic diene monomers is quickly reduced in temperature to condense out methyl cyclopentadiene and particularly $C_6$ to $C_9$ hydrocarbons with some of the cyclopentadiene. At this point, moisture present in the vapor stream is also nearly all condensed out from the vapor stream so that the remaining hydrocarbon vapor stream containing uncondensed cyclopentadiene with $C_1$–$C_5$ hydrocarbons can be subjected to sufficiently low temperatures for separating out the lower boiling $C_1$ to $C_4$ hydrocarbons and thus obtain a liquid concentrate of cyclopentadiene monomer and dimer which can be easily recovered from the remaining liquefied hydrocarbons obtained from the vapor stream. In the second stage a satisfactory quick reduction in temperature is obtained by compression and cooling;

(3) The liquid hydrocarbon condensate fraction of mainly $C_5$–$C_9$ hydrocarbons condensed from the vapor stream in the second stage can be subjected to a stripping treatment for accomplishing further removal of hydrocarbons containing less than 6 carbon atoms per molecule so that these can be processed with the described vapor stream which leaves the second stage; then, the thus stripped liquid is in satisfactory condition for separating therefrom a concentrated mixture of cyclopentadiene dimer and methyl cyclopentadiene dimer from which relatively high purity cyclopentadiene monomer or dimer can be recovered as one product and methyl cyclopentadiene monomer or dimer can be recovered as another separate product.

In the steps outlined, the methyl cyclopentadiene present in any stream together with cyclopentadiene undergoes substantially the same treatment so that the final product of any such stream will tend to contain the dimer of methyl cyclopentadiene with the dimer of cyclopentadiene. Therefore, it becomes necessary in making separations between cyclopentadiene and methyl cyclopentadiene monomers to avoid dimerization of both homologues at the same time.

The features of the process will be described in more detail with reference to a simplified flow diagram shown in the accompanying drawing.

As illustrated in the drawing, a charging stock of vaporized gas oil, kerosene, or naphtha hydrocarbons is passed through a high temperature cracking coil 1 in heater 2; and the resulting cracked product effluent is discharged from the cracking coil 1 through the transfer line 3 into an intermediate or lower part of a fractionating tower 4. The hydrocarbon charging stock, such as boils in the range of 250° F. to 700° F. is passed through the heating coil 1 to be heated at cracking temperatures in the range of 1000° F. to 1600° F. for a short cracking period of about 1 to 5 seconds, sufficient steam being mixed with the charged feed of hydrocarbons to give a total of about 50 to 90 mole per cent steam based on the feed in the cracking zone. A total pressure of from about 1 to 10 atm. is maintained in the heating tube or cracking coil 1. The cracked product effluent stream is discharged from the furnace heating coil 1 into the transfer line 3 at temperatures in the range of about 1000° F. to 1500° F. under a relatively low pressure of the order of 0 to 100 p. s. i. g. In the transfer line 3 the cracked product effluent stream is quickly quenched to lower its temperature to temperatures to between about 650° F. and 350° F. as it is discharged into the fractionator 4, which may be termed the low-pressure primary fractionator. In the low-pressure primary fractionator 4, the cracked products are separated mainly into an overhead gas-vapor stream, a cycle gas oil condensate which collects on an intermediate place above the feed inlet from line 3, and a bottom tar stream which is withdrawn through line 6. The cycle gas oil may be withdrawn through line 5 and through a cooler 7 to be used as quench liquid injected into transfer line 3. In addition, cool water may be introduced through a quench line 8.

As the liquid portion and reflux condensates of the quenched products descend to the bottom part of the fractionator 4, these liquids are maintained at temperatures in the range of 350° F. to 650° F. The overhead vapors withdrawn from the top part of fractionator 4 by line 10 are maintained at temperatures of the order of 300° F. to 350° F. The pressure in the fractionator 4 is maintained at about 0 to 10 p. s. i. g. In this manner a separation of normally gaseous and volatile $C_1$ to about $C_{15}$ hydrocarbons with gaseous hydrogen formed in the cracking and a large proportion of steam is obtained at a rapid rate. Under these conditions, approximately all the cyclopentadiene and methyl cyclopentadiene present is kept in the form of monomers and is carried along in the overhead gas-vapor stream, leaving hardly any appreciable amount of cyclopentadiene or methyl cyclopentadiene dimer in the liquid portions of the cracked products collected in the fractionator 4.

The overhead gas-vapor stream from the primary fractionator 4 is passed by line 10 through a cooling condenser 11 where it is lowered rapidly in temperature between about 90° F. and 135° F. in order to condense out heavy ends, mainly $C_{10}+$ hydrocarbons, together with a large part of the steam without giving much opportunity for the cyclopentadiene homologues to undergo dimerization; and the resulting condensates are collected as liquid phases in receiver 12. A portion of the hydrocarbon liquid condensate phase may be refluxed by line 13 to the upper part of fractionator 4 to assist in controlling temperatures and a remainder of the condensates, both aqueous and hydrocarbon, are withdrawn through lines 14 and 15, respectively. The remaining gas-vapor streams still diluted with some water vapor is next passed from the receiver 12 through a series of a compressor 16, cooler 17, and a knockout drum 18. One or more of such series may be used to quickly compress and cool the gas-vapor stream to temperatures in the range of 90° F.–135° F. under pressures of the order of 40–210 p. s. i. g. so that approximately all the water vapor is condensed out with most of the $C_6+$ hydrocarbons without giving the cyclopentadiene monomer an opportunity to undergo substantial dimerization or polymerization and at the same time effecting a separation of methyl cyclopentadiene monomer as part of the condensed out liquid. The number and sizes of the compressors, coolers, and knock-out drums depends on their required capacities and the desired sharpness of separation. For simplification, the gas-vapor stream is herein indicated to be passed through a single series. The knocked-out liquid is withdrawn from drum 18 by line 19, and the remaining gas-vapor stream containing cyclopentadiene monomer with principally $C_1-C_5$ hydrocarbons, but with relatively little methyl cyclopentadiene, is withdrawn from drum 18 by line 20 and is ready for further processing to separate cyclopentadiene as dimer therefrom.

The vapor stream from line 20 may be given a purification treatment, such as scrubbing with caustic and further drying, e. g., by chemical driers, e. g. calcium chloride in unit 21, before being compressed by compressor 22 and cooled in heat exchanger 23 to liquefy most of the hydrocarbon vapors for separation of gaseous hydrogen and the $C_1-C_4$ hydrocarbons by fractional distillation. Up to this point, no appreciable amount of dimerization has occurred in the cyclopentadiene which remained in the vapor phase, starting with the vapor stream leaving the primary low pressure fractionator 4. Following this point, it may be desirable to flash vaporize the $C_1-C_4$ hydrocarbons in a series of distillation zones with reduction of pressure in order to obtain narrow fractions of the vaporized $C_1-C_4$ hydrocarbons; however, for the sake of simplicity, it is indicated that the compressed and cooled stream from line 24 is discharged into a single fractional distillation zone 25 from which the distilled $C_1-C_4$ hydrocarbons are removed overhead. The substantially dry gas-vapor stream containing the cyclopentadiene monomer is compressed in compressor 22 and chilled in heat exchanger 23 to completely liquefy the $C_5+$ hydrocarbons, using e. g., liquid propene or $NH_3$ refrigerant, then is discharged into the fractionating zone of column 25 which is operated at temperatures of about 125° F. at the top to about 250° F. at the bottom and at pressures of about 80–90 p. s. i. g.

The residual liquid or bottoms fraction of mainly $C_5$ hydrocarbons from the fractional distillation zone 25 should be substantially free of $C_4$ hydrocarbons and lower boiling materials and contain very little $C_{10}$ or higher boiling hydrocarbons other than cyclopentadiene dimer and some methyl cyclopentadiene dimer. This bottoms $C_5+$ liquid, thus obtained is characterized by having, in general, a large proportion of $C_5$ mono-olefins and relatively small amounts of isoprene, piperylene, cyclopentadiene monomer, etc. as indicated in the following typical analysis:

TABLE 1

*Analytical data on $C_5+$ fraction*

Components:

| | |
|---|---|
| $C_4$ Hydrocarbons____weight percent__ | 1.0 |
| Cyclopentadiene monomer____do____ | 6.2 |
| Isoprene _____do____ | 10.0 |
| Piperylenes _____do____ | 15.0 |
| $C_5$ saturates _____do____ | 2.0 |
| $C_5$ mono-Olefins (predominantly type I)_____weight percent__ | 47.0 |
| Me-cyclopentadiene monomer__do____ | 0.8 |
| Benzene _____do____ | 3.0 |
| Other $C_6$ to $C_9$ of cyclopentadiene weight percent__ | 7.0 |
| Dimer of cyclopentadiene____do____ | 5.3 |
| Dimer of methyl cyclopentadiene weight percent__ | 0.7 |
| Other $C_{10}+$_____do____ | 0.6 |
| Sp. Gr. 60/60_____ | 0.7157 |
| A. S. T. M. Dist. I.B.P_____ | 96. |

The bottoms $C_5+$ fraction contains a very small amount of aromatic hydrocarbons, principally benzene, and very small amounts of $C_{10}+$ hydrocarbons other than the desired cyclic diene dimers. Therefore, with a simple fractionation, a satisfactorily high purity dimer product can be separated from this bottoms liquid by simple fractionation even after the bottoms liquid is first soaked for 2 to 24 hours at 150° F.–250° F. in order to dimerize the monomeric cyclic dienes that are present. Such a soaking and fractionation, e. g., a fractionation under atmospheric pressure between 130° F. and 200° F. has yielded between 85% and 95% of purity dimer product containing principally cyclopentadiene dimer and relatively small amount of methyl cyclopentadiene. Such a product would be obtained from the stream withdrawn from the bottoms line 27 through the outlet line 28. On the other hand, the bottoms stream from line 27 may be processed together with another $C_5+$ liquid material obtained from the stripped knocked-out liquids as will now be further explained.

The knock-out liquids from drum 18 withdrawn by line 19 are in general characterized as boiling in the range of about 90° F. to 350° F., but with about 90 volume % which distills off the temperatures up to about 200° F. There are a small amount of $C_3$ and $C_4$ hydrocarbons present, but mainly $C_5$ and $C_6$ hydrocarbons, with relatively small amounts of $C_7$ to $C_9$ hydrocarbons. This liquid can be reduced and fractionated under vacuum to obtain a narrow boiling heat cut. (This cut boils near 326° F. at 760 mm. Hg). Under a pressure of about 44 mm. Hg absolute this liquid can be reduced to obtain a residual liquid product which contains as much as about 70 to 75 weight percent cyclic diene dimers. The reduction is preferably carried out in one or more stripping zones, 29 and 31. In using two stripping zones, the purpose is to first make a sharp removal of any $C_3$ and $C_4$ hydrocarbons present so that these may be taken overhead through line 32 from the first stripping zone 29 to be blended with the vapor stream in line 20 in order to recover the $C_3$ and $C_4$ hydrocarbons. The residual liquids from the first stripping zone 29 are led by line 33 into the second stripping zone 31 for stripping out $C_5$ hydrocarbons, which can be passed overhead by line 34 through cooler 35 to join the stream in line 24 which goes to the fractionator 25.

The first stripping zone 29 may be operated under a pressure of 160 to 180 p. s. i. g. with an overhead temperature of 140° F. to 160° F. The second stripping zone 31 may be operated under a pressure of 100 p. s. i. g. and with an overhead vapor temperature of 160° F. to 170° F. The residual liquids are withdrawn from the second stripping zone 31 by line 36 and may be joined by liquid bottoms from tower 25 passed from line 27 through line 37 to be sent through line 38 into a dimerization soaking zone 39. The soaking zone 39 is operated at temperatures of 150° to 250° F. under sufficient pressure to maintain the hydrocarbons in liquid phase and for sufficient reasonable residence time of 2 to 24 hours to effect approximately complete dimerization of the cyclic dienes. The dimerization effluent product is discharged from soaker 39 through line 40 into a fractionating column 41, wherein under about atmospheric pressure or reduced pressure, $C_5$ up through $C_9$ hydrocarbons are distilled, so as to leave a concentrated dimer bottoms product. An inert gaseous distillation agent, however, such as steam, may be introduced in a bottom part of line 41 through line 43 to aid the distillation. The dimer concentrate bottoms are withdrawn from the bottom part of tower 41 through line 44, to be then sent as final product to storage by line 45 or be sent by line 46 to a finishing unit for a separation of cyclopentadiene from methyl cyclopentadiene.

Through intensive investigation it has been found that the dimer concentrate recovered in the manner described as bottoms from tower 41 tends to contain close to nearly equal proportions of methyl cyclopentadiene dimer and cyclopentadiene dimer and a small amount of ethyl or dimethyl cyclopentadiene dimer, and in some instances, the methyl cyclopentadiene dimer has appeared in preponderance. Accordingly it has been found desirable to make a separation between the homologous dimers and this is conducted in the next stage which is described.

For the separation of the homologous cyclic dienes individually from the dimer concentrates, the bottoms dimer concentrate is passed by line 46 into a cracking or dedimerization zone 47 in which the liquid dimer concentrate is maintained at temperatures of the order of 300° F. to 650° F. in order to decompose the dimer into the monomer. Residual liquids may be removed from 47 by line 56. The vapors released in the cracking zone 47 are passed by line 48 into a first fractionation zone 49 in which under an atmospheric pressure or thereabout and with a top temperature of about 120° F. ($C_5$) cyclopentadiene monomer is distilled as an overhead product removed through line 50. Lower pressures with lowered temperature may be used. The residual liquid bottoms are withdrawn from fractionator 49 through line 51 to a second fractionator 52 wherein under a pressure of about 0 p. s. i. g. the ($C_6$) methyl cyclopentadiene monomer is distilled overhead and removed through line 53. The higher boiling residual liquid is withdrawn from the bottom of fractionator 52 through line 54 as an end bottoms product and a portion thereof may be recycled through line 55 for further cracking in zone 47. By this final stage treatment the separate $C_5$ and $C_6$ monomer streams distilled from fractionators 48, 49, and 52 are relatively high purity streams of the order of 85% to 95% purity and each of these streams may be separately subjected to dimerization in order to recover the respective dimer products, the dimerization in each instance being conducted at temperatures of the order of 150° F. to 250° F.

Having described the invention, it is claimed as follows:

1. A process for segregating cyclopentadiene and methyl cyclopentadiene from vapor phase hydrocarbons cracked in the presence of steam, which comprises quickly quenching the cracked hydrocarbons to a temperature between 350° F. to 650° F. under a pressure of 0 to 100 p. s. i. g. to maintain $C_1$ to $C_9$ hydrocarbons in a vapor phase stream and leaving substantially none of the cyclopentadiene and methyl cyclopentadiene as dimer in the resulting quenched liquid portion of the cracked hydrocarbons, compressing and cooling the thus separated vapor phase stream to temperatures below 135° F. under a pressure of 40 to 210 p. s. i. g. to condense out therefrom most of the $C_6+$ components, removing the thus condensed out $C_6+$ components including some $C_5$ and a small amount of lower hydrocarbons from the vapor phase stream, stripping said lower hydrocarbons from the $C_6+$ components, passing the residual $C_6+$ components through a soaking zone to dimerize cyclopentadiene and methyl cyclopentadiene monomer present therein, fractionating from the resulting $C_{10}$ and $C_{12}$ dimers other $C_5$ through $C_9$ hydrocarbons to obtain a dimer concentrate, passing the said dimer concentrate into a dedimerization zone and separating resulting monomers of cyclopentadiene and methyl cyclopentadiene by fractional distillation.

2. The process for segregating cyclopentadiene and methyl cyclopentadiene from a stream of cracked hydrocarbons containing $C_1$–$C_9$ hydrocarbons in the vapor phase, which comprises quenching said stream of cracked hydrocarbons to a temperature between 350° F. and 650° F. under a pressure of 0 to 100 p. s. i. g. to maintain $C_1$ to $C_9$ hydrocarbon components of said stream in the vapor phase while higher boiling hydrocarbon components of said stream undergo condensation, fractionating the vapor components of the quenched stream from the resulting quenched liquid condensate at temperatures in the range of 350° F. to 650° F. to maintain $C_1$ to $C_9$ hydrocarbons in a vapor phase stream which contains cyclopentadiene and methyl cyclopentadiene monomers, compressing said fractionated vapor phase stream to pressures in the range of 40 to 210 p. s. i. g., cooling the vapor stream thus compressed to temperatures in the range of 90° F. to 135° F. in order to condense mainly $C_5$ to $C_9$ hydrocarbons into liquid, passing the resulting condensed $C_5$ to $C_9$ hydrocarbons to a stripping zone, stripping $C_4$ and any lower hydrocarbons present from said liquid in said stripping zone, passing residual liquid from said stripping zone to a soaking zone to dimerize cyclopentadiene and methyl cyclopentadiene monomers present therein and to obtain a concentrate of cyclopentadiene and methyl cyclopentadiene dimers.

3. In a process for segregating cyclopentadiene and methyl cyclopentadiene from a stream of cracked hydrocarbons containing $C_1$ to $C_9$ hydrocarbons in the vapor phase, steps which comprise quenching the stream of cracked hydrocarbons from an elevated cracking temperature to a temperature between 350° F. and 650° F. under a pressure of 0 to 100 p. s. i. g. to maintain $C_1$ to $C_9$ hydrocarbon components of said stream in the vapor phase while higher boiling components of said stream undergo condensation, fractionating the vapor components of the stream from quenched liquid condensate of the stream at temperatures in the range of 350° F. to 650° F. under a pressure of 0 to 10 p. s. i. g., admixing steam with said vapor components as they are being fractionated, compressing the thus fractionated vapors to pressures of 40 to 210 p. s. i. g. and cooling the compressed vapors to temperatures in the range of 90° F. to 135° F. to condense therefrom mainly $C_5$ to $C_9$ hydrocarbon components, passing the thus condensed $C_5$ to $C_9$ hydrocarbon components to a stripping zone, stripping $C_4$ and any lighter hydrocarbons from liquids in said stripping zone, passing the residual liquids containing the $C_5$ to $C_9$ hydrocarbons to a soaking zone to dimerize cyclopentadiene and methyl cyclopentadiene monomers present in said residual liquids, then distilling from the liquid dimer-containing product of the soaking zone $C_5$ to $C_9$ hydrocarbons to obtain a residual concentrate of the cyclopentadiene and methyl cyclopentadiene dimers.

THOMAS G. JONES.

References Cited in the file of this patent

UNITED STATES PATENTS

| Number | Name | Date |
|---|---|---|
| 2,387,993 | Hepp | Oct. 30, 1945 |
| 2,439,307 | Legatski | Apr. 6, 1948 |